United States Patent
Noro et al.

(10) Patent No.: US 8,090,506 B2
(45) Date of Patent: Jan. 3, 2012

(54) ELECTRICALLY OPERATED MIRROR CONTROL DEVICE AND METHOD OF CONTROLLING REVERSE LINKING OPERATION

(75) Inventors: Yoshiki Noro, Wako (JP); Kenji Shioiri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 916 days.

(21) Appl. No.: 12/113,553

(22) Filed: May 1, 2008

(65) Prior Publication Data

US 2008/0278834 A1    Nov. 13, 2008

(30) Foreign Application Priority Data

May 8, 2007    (JP) ................................. 2007-122928

(51) Int. Cl.
*G05D 3/00* (2006.01)
(52) U.S. Cl. ............................................ 701/49; 701/36
(58) Field of Classification Search .................... 701/36, 701/49; 307/9.1, 10.1; 359/838, 841, 843–844; 296/1.11

See application file for complete search history.

(56) References Cited

U.S. PATENT DOCUMENTS

| 4,190,326 A * | 2/1980 | Brodbeck ..................... 359/876 |
| 4,428,649 A * | 1/1984 | Main et al. ..................... 359/876 |
| 7,322,709 B2 * | 1/2008 | Kurumagawa et al. ....... 359/872 |
| 7,885,743 B2 * | 2/2011 | Noro et al. ..................... 701/49 |
| 2004/0257684 A1 | 12/2004 | Meyer et al. |

FOREIGN PATENT DOCUMENTS

| JP | 2001-213235 | 8/2001 |
| JP | 2003-034185 | 2/2003 |
| JP | 2003-267137 | 9/2003 |
| JP | 2005-161936 | 6/2005 |

* cited by examiner

*Primary Examiner* — Yonel Beaulieu
(74) *Attorney, Agent, or Firm* — Rankin, Hill & Clark LLP

(57) ABSTRACT

An electrically operated mirror control device comprises a controller which includes a reverse linking unit for carrying out a reverse linking operation to tilt a mirror to change a mirror surface angle in linking with reversing of a vehicle, and a mirror switch which adjusts an amount of a change in the mirror surface angle of the mirror in the reverse linking operation. When the controller detects a predetermined operation in the reverse linking operation, a reverse angle memorizing control unit changes a first setting stored in a memorizing unit into a second setting of the mirror surface angle including the amount of the change in the mirror surface angle adjusted by the mirror switch at an end of the reverse linking operation.

8 Claims, 3 Drawing Sheets

ELECTRICALLY OPERATED MIRROR CONTROL DEVICE AND METHOD OF CONTROLLING REVERSE LINKING OPERATION

CROSS-REFERENCE TO RELATED APPLICATION(S)

This application claims the foreign priority benefit under Title 35, United States Code, §119 (V1)-(d), of Japanese Patent Application No. 2007-122928, filed on May 8, 2007 in the Japan Patent Office, the disclosure of which is herein incorporated by reference in its entirety.

BACKGROUND OF THE INVENTION

1. Field of the Invention

The present invention relates to an electrically operated mirror control device and a method of controlling the device in a reverse linking operation, and more specifically, relates to the electrically operated mirror control device which carries out the reverse linking operation of automatically tilting a mirror in reversing a vehicle and the method of controlling the device in the reverse linking operation.

2. Description of the Related Art

Rearview mirror devices, such as an automobile outer door mirror and a fender mirror, capable of changing a mirror angle in an upward/downward direction and in a rightward/leftward direction by running a DC motor (direct current motor) are known. The DC motor is rotated for a mirror surface control during a switch operation for controlling the mirror in a vehicle.

A mirror of the rearview mirror device can be tilt in every direction on a central fulcrum installed at a back of the rearview mirror device. By rotatably advancing or moving back a center of a pivot in any one direction of the right/left of the central fulcrum and in any one direction of the up/down of the central fulcrum, the angle of the mirror can be changed in a rightward/leftward direction and in an upward/downward direction respectively, and the mirror can finally be directed to a direction which is set based on the angles of the rightward/leftward direction and the upward/downward direction.

The centers of the pivots for the rightward/leftward direction and the upward/downward direction can rotatably be advanced and moved back by operating respective individual DC motors, and the angle of the mirror can be adjusted in a direction which is determined by the individual DC motor driven by a switch operation.

Apart from the adjustment of the mirror surface angle by the switch operation mentioned above, an outer door mirror comprises a mechanism of changing angles, wherein, when a shift position of a transmission of a vehicle is placed in a reverse gear position, a mirror is automatically turned downward at a predetermined angle set in advance, and wherein, when the shift position of the transmission is shifted from the reverse gear position to another gear position, for example, a drive gear position, the mirror is automatically turned upward and returned to an original angle.

Accordingly, when the vehicle is backed up into a garage, a reverse linking operation is carried out, wherein the mirror is tilted downward in reversing a vehicle, and wherein the mirror is automatically returned to the original angle except during reversing of the vehicle. It is preferable that the rearview mirror device allows a driver to check the vicinity of rear wheels at a slightly downward angle, rather than the right behind the vehicle, because rear wheels that turn into a blind spot can be visually checked.

In the tilting operation of the outer door mirror in reversing the vehicle, the mirror is tilted at a predetermined mirror surface angle in reversing the vehicle, in some case, an angle desired by a driver is different from the predetermined mirror surface angle. Regarding an improved automobile rearview mirror device which automatically turns the mirror downward in reversing a vehicle, JP2003-267137A discloses a technology of changing angles, wherein, when an mirror surface angle operated by the driver in reversing a vehicle is stored, and the mirror is turned downward in reversing the vehicle again, the mirror is turned downward at the mirror surface angle stored previously.

However, in the technology disclosed by JP2003-267137A, the mirror surface angle is changed every time the mirror of the rearview mirror device is adjusted in reversing the vehicle. Therefore, when the driver changes angles, the mirror surface angle is frequently required to be readjusted.

BRIEF SUMMARY OF THE INVENTION

An aspect of the present invention can provide an electrically operated mirror control device and a method of controlling the device in a reverse linking operation, wherein, when a shift position of a transmission is placed in a reverse gear position, a rearview mirror device automatically turns a mirror downward, and wherein the angle of turning the mirror downward can be set and added to angles adjusted in advance by a regular driver.

A first aspect of the present invention provides the electrically operated mirror control device comprising a control unit including: a reverse linking unit for carrying out a reverse linking operation, wherein a mirror surface angle is changed by tilting a mirror in linking with reversing of a vehicle and; and a reverse angle memorizing control unit for storing a setting value of the mirror surface angle in the reverse linking operation in a memorizing unit (memory), and an angle adjusting unit for adjusting an amount of change in the mirror surface angle of the mirror in the reverse linking operation. When the reverse angle memorizing control unit detects a predetermined operation in the reverse linking operation, the reverse angle memorizing control unit changes the setting value stored in the memorizing unit into a setting value of the mirror surface angle adding the amount of change in the mirror surface angle adjusted by the angle adjusting unit at the end of the reverse linking operation. When the reverse linking unit again carries out the reverse linking operation, the reverse linking unit changes the setting value of the mirror surface angle into the setting value renewed.

Accordingly, in addition to the mirror surface angle adjusted by the regular driver, the present invention can provide a mirror surface angle desired by another driver in the reverse linking operation, and the mirror surface angle set by the driver can be made afterwards.

The predetermined operation can be an operation of turning off an ignition switch once and subsequently turning on the ignition switch again.

Further, the predetermined operation can be a motion of repeating an operation of turning off the ignition switch once and subsequently turning on the ignition switch again a predetermined number of times.

Accordingly, the present invention can provide the electrically operated mirror control device which can store the mirror surface angle desired by the driver in a simple manner in the reverse linking operation.

Herein, the control unit further includes a memorizing inhibitor which prevents the reverse angle memorizing control unit from changing the setting value, upon detecting a predetermined condition being satisfied during the predetermined operation.

Accordingly, the present invention can prevent the electrically operated mirror control device from storing a false mirror surface angle.

Preferably, the predetermined condition is that the predetermined operation is not made in a predetermined time interval.

Preferably, the predetermined condition is that a door is opened during the predetermined operation.

Accordingly, the present invention can provide the electrically operated mirror control device, whereby the false setting of the mirror surface angle can be prevented in a simple manner.

A method of controlling the electrically operated mirror control device in the reverse linking operation is characterized in that the electrically operated mirror control devise comprises: a control unit, the control unit, comprising: a reverse linking unit of carrying out the reverse linking operation, wherein the mirror surface angle is changed by tilting a mirror in linking with reversing of a vehicle and; and a reverse angle memorizing control unit of storing a setting value of the mirror surface angle in the reverse linking operation in a memorizing unit (memory); and an adjusting unit of adjusting the mirror surface angle of the mirror in the reverse linking operation, wherein the method comprising the steps of: changing a setting value stored in the memorizing unit into a setting value of the mirror surface angle including an amount of change in the mirror surface angle adjusted by the angle adjusting unit at the end of the reverse linking operation, when the reverse angle memorizing control unit detects a predetermined operation in the reverse linking operation; and storing the setting value of the mirror surface angle including the amount of change in angle adjusted by the angle adjusting unit at the end of the reverse linking operation.

Accordingly, the present invention can provide the method of controlling the electrically operated mirror control device in the reverse linking operation, wherein a mirror surface angle desired by the driver in the reverse linking operation can be set and added to the mirror surface angles adjusted by the regular driver.

According to the aforementioned structure and operations, the present invention can provide the electrically operated mirror control device, wherein the downward angle of the mirror in the reverse linking operation can be set and added to those of the regular driver, and the method of controlling the electrically operated mirror control device in the reverse linking operation.

DETAILED DESCRIPTION OF THE PREFERRED EMBODIMENTS

Hereinafter, a preferred embodiment of the present invention (hereinafter referred to as the embodiment) will be descried with reference to attached drawings.

Figure 1:
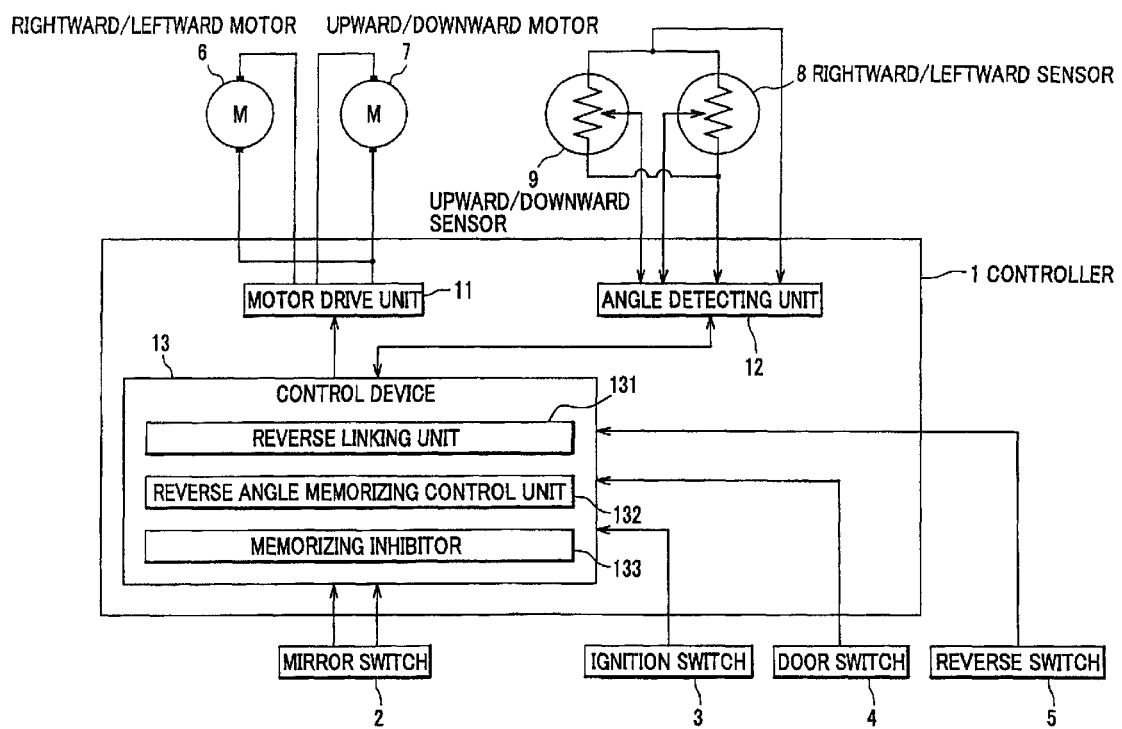
FIG. 1 is a block diagram showing a controller and peripheral devices of an electrically operated mirror control device.

FIG. 1 shows a structure of a controller 1 (control means) and peripheral devices of an electrically operated mirror control device of the embodiment.

The controller 1 receives a signal from a mirror switch 2 which is an angle adjusting unit, and activates a motor drive unit 11 via a control unit 13, and drives a rightward/leftward motor 6 and an upward/downward motor 7.

The rightward/leftward motor 6 and the upward/downward motor 7 rotatably advance and move back the centers of pivots which tilt the mirror of an electrically operated mirror not shown in a rightward/leftward direction and in an upward/downward direction, respectively. Accordingly, an mirror surface angle desired by a driver is made.

A door switch 4 is detects an opening and closing of a door. A reverse switch 5 detects a shift lever in a reverse position. A rightward/leftward sensor 8 and an upward/downward sensor 9 are sensors which detect a rightward/leftward tilt angle and an upward/downward tilt angle of a mirror of an outer door mirror respectively. The control unit 13 receives signals of an output voltage value detected by the sensors 8 and 9 via an angle detecting unit.

The control unit 13 comprises a computer which includes a CPU (Central Processing Unit), a ROM (Read Only Memory) and a RAM (Random Access Memory), the ROM storing programs which carry out instructions as will be described later.

Apart from a change of the mirror angle by the mirror switch 2, when the shift lever is placed in the reverse position, the reverse switch 5 is turned on, and the control device 13 controls the motor drive unit 11 by a reverse linking unit 131 and drives the upward/downward motor 7 until the mirror surface angle of the outer door mirror becomes equal to a setting value stored in a memorizing unit (not shown) of the control device 13. Accordingly, the driver can easily check a road in the rearward direction of the vehicle or the position of a chock when reversing the vehicle, for example, backing the vehicle up into a garage.

When the shift lever is returned, for example, to a neutral position from the reverse position, the reverse switch 5 is turned off, and the reverse linking unit 131 controls the motor drive unit 11 and drives the upward/downward motor 7 in an upward direction until the mirror surface is returned to the original position prior to reversing.

A series of the operations mentioned above, where the shift lever is placed in the reverse position and returned to the original position, is referred to as a reverse linking operation hereinafter.

Figure 2:
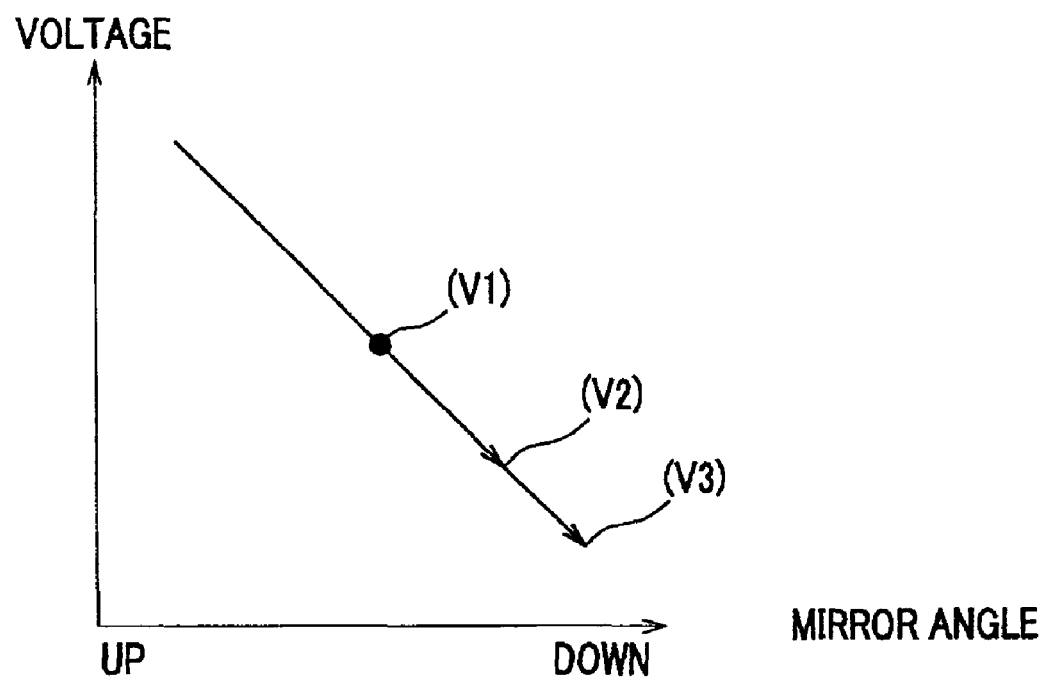
FIG. 2 is a graph showing a variation of an output voltage value of a upward/downward sensor in a reverse linking operation.

FIG. 2 shows a variation of an output voltage value of the upward/downward sensor 9 in the reverse linking operation.

When the shift lever is placed in the reverse position, the reverse switch 5 is turned on, and the mirror surface angle is tilted downward by operating the upward/downward motor 7, the output voltage value of the upward/downward sensor 9 is changed from an output voltage value (V1) corresponding to the mirror surface angle in a normal state to an output voltage value (V2) corresponding to the mirror surface angle which is set based on a predetermined value in a reverse linking state. When a drive feels that the mirror needs to be slightly turned downward in the reverse linking state shown as (V2) in FIG. 2, the driver can use a manual adjustment mode and adjust the mirror surface angle by operating the mirror switch 2 in the downward direction. Accordingly, the output voltage value of the upward/downward sensor 9 is changed to an output voltage value (V3) corresponding to the mirror surface angle adjusted. When the driver feels that the mirror surface angle of the mirror has been turned downward more than expected in the reverse linking state shown as (V2), the driver can adjust the mirror surface angle by operating the mirror switch 2 in the upward direction.

When the mirror surface angle adjusted in the manual adjustment mode is preferable, and the driver turns an ignition switch 3 to an off-position, an on-position, the off-position and the on-position, a reverse angle memorizing control unit 132 of the control device 13 of the controller 1 changes setting values of the mirror surface angles corresponding to (V1) to (V3) in FIG. 2 into the setting values in the reverse linking operation.

In the operation mentioned above, when the ignition switch is not turned to the on-position after being turned to the off-position, or is not turned to the on-position in a predetermined time interval after being turned to the off-position, the on-position and the off-position, a memorizing inhibitor 133 determines that the settings are invalid, stops storing the mirror surface angles corresponding to (V1) to (V3) in FIG. 2 in the reverse angle memorizing control unit 132, and puts back the mirror surface angles set prior to the execution of the reverse linking operation, whereby the output voltage value is returned to the setting in (V1). Herein, the mirror surface angle of the mirror is returned to the mirror surface angle corresponding to (V1) but not limited. The mirror surface angle of the mirror can be returned to the mirror surface angle corresponding to the setting in (V2) adjusted before aborting or returned to the mirror surface angle corresponding to (V3) adjusted before aborting, whereby the mirror remains as it is.

Figure 3:
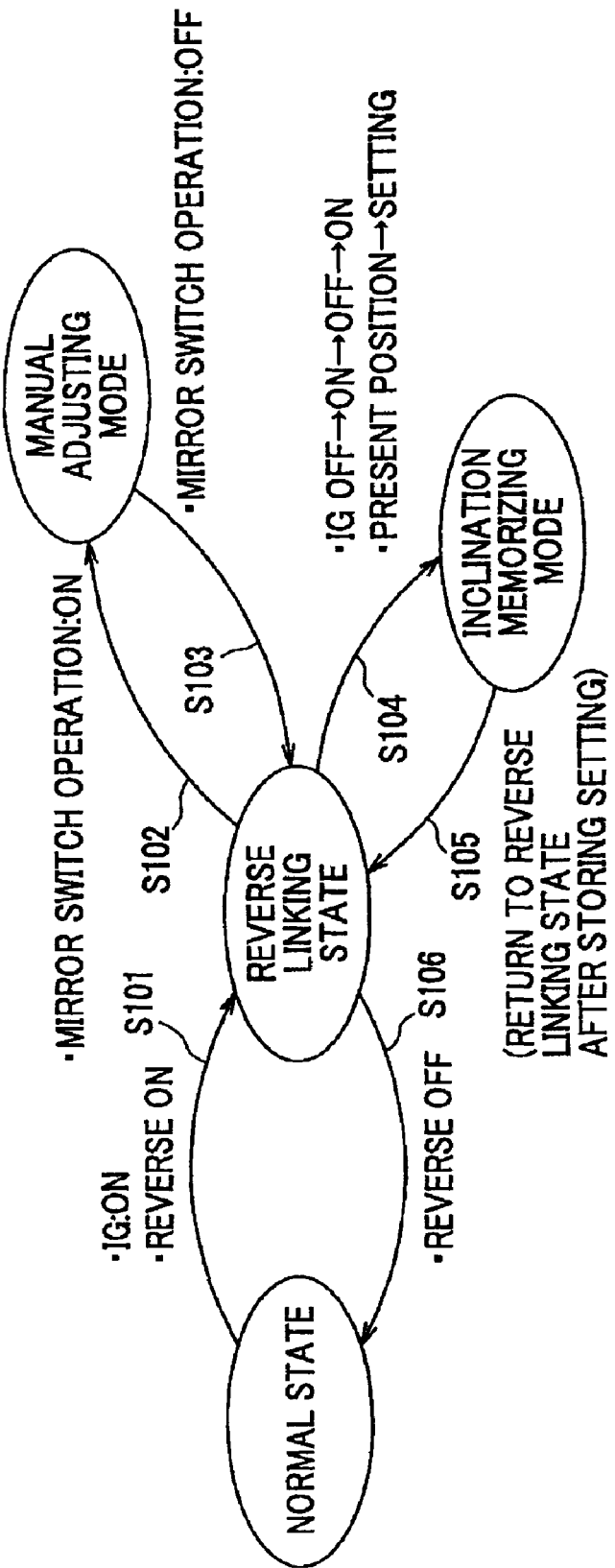
FIG. 3 is a state transition diagram regarding the reverse linking operation and a memorizing operation of a predetermined angle.

Next, FIG. 3 is a state transition diagram with regards to the reverse linking operation and the operation of storing setting values. The state transition between the reverse linking operation and the operation of storing setting values, and a method of controlling the electrically operated mirror control device in the reverse linking operation will be described with reference to FIG. 3 (refer to FIG. 1 and FIG. 2 as needed).

With reference to FIG. 3, when the ignition switch 3 is turned on (IG: ON) in "Normal State", and the shift lever is placed in the reverse position by a driver (Reverse On), the reverse switch 5 is turned on, and the state transition is shifted to "Reverse Linking State" (step S101: reverse linking process). The reverse linking unit 131 changes the setting value of the mirror surface angle into a setting value stored in the memorizing unit (memory) at this time.

At this state, when the mirror switch 2 is operated by the driver (Mirror Switch Operation: On), the mirror surface angle of the mirror is adjusted, and the state transition is shifted to "Manual Adjustment Mode" (step S102: angle fine-tuned adjustment process).

At this state of the mode, when the operation of the mirror switch 2 is made (Mirror Switch Operation: Off), the state transition is returned to "Reverse Linking State" (step S103). The steps S102 and S103 can be repeated. When the state transition is shifted from "Manual Adjustment Mode" to "Reverse Linking State", the mirror surface angle of the mirror is kept as being adjusted in "Manual Adjustment Mode".

In the "Reverse Linking State", when the driver determines that the mirror surface angle adjusted in the "Manual Adjustment Mode" is preferable, the driver turns the ignition switch 3 to the off-position, the on-position, the off-position, and the on-position (IG: Off, On, Off, On). Accordingly, the state transition is shifted to "Inclination Memorizing Mode" (step S104: memorizing process), where the reverse angle memorizing control unit 132 changes the setting value of the mirror surface angle of the mirror into a setting value stored in the memorizing unit (memory) at this time. After storing the setting value, the state transition is returned to "Reverse Linking State" (step S105).

In the step S104, when the memorizing inhibitor 133 of the control unit 13 of the controller 1 detects that a predetermined time interval passes from the time the ignition switch 3 is turned to the off-position and the on-position until the ignition switch 3 is again turned to the off-position, or from the time the ignition switch 3 is turned to the off-position, the on-position, and the off-position until the ignition switch 3 is again turned to the on-position, the process of changing the mirror surface angle of the mirror by the reverse angle memorizing control unit 132 is invalidated (memorizing inhibiting process). When the memorizing inhibitor 133 detects, via the door switch 4, that the door is opened from the time the ignition switch 3 is turned to the off-position and the on-position until the ignition switch 3 is again turned to the off-position, or from the time the ignition switch 3 is turned to the off-position, the on-position, and the off-position until the ignition switch 3 is again turned to the on-position, the process of changing the mirror surface angle of the mirror by the reverse angle memorizing control unit 132 is invalidated (memorizing inhibiting process). In the memorizing inhibiting processes, when the state transition is shifted to from "Inclination Memorizing Mode" to "Reverse Linking State", a control of returning the mirror surface angle to the setting value in the normal state or to the setting value stored at this time may as well be executed.

Returning to "Reverse Linking State", the shift lever is placed from the reverse position to, for example, the neutral position or the drive position, the reverse switch 5 is turned off (Reverse Off). The reverse linking unit 131 puts back the mirror surface angle prior to shifting to the reverse linking state, thereby the state transition is shifted to "Normal State" (step S106). A duration of "Reverse Linking State" may as well be measured by a timer. When the duration of "Reverse Linking State" exceeds a predetermined time interval, the state transition may as well be shifted from "Reverse Linking State" to "Normal State".

As mentioned above, after memorizing the setting values of the mirror surface angle in the memorizing unit, the shift of the mirror surface angle is executed in a range of (V1) to (V3) as shown in FIG. 2 in the reverse linking operation.

Accordingly, by learning and storing the mirror surface angle fine-tuned, the present invention can provide the reverse linking operation which meets the driver's desire.

According to the embodiment of the present invention mentioned above, when the driver changes the shift lever to the reverse position, and a downward angle of the electrically operated mirror is different from an angle desired by the driver, the driver can adjust the mirror surface angle to the angle desired by the driver by operating the mirror switch 2 and allow the controller 1 to learn the angle adjusted only by a simple manipulation afterwards. If the mirror switch 2 is operated during the reverse linking operation, and a designated operation is not made afterwards, the controller 1 does not learn the downward angle adjusted by mistake.

In the embodiment, one setting of the mirror surface angle of the mirror in the reverse linking operation is stored. However, a plurality of settings can be set. By providing a unit which allows a user to select, a plurality of settings, each of which has a different mirror surface angle, can be stored. Consequently, when a plurality of drivers use the vehicle, a downward angle desired by each driver in the reverse linking operation can be set.

Further, in addition to the settings, the present invention may have a structure that an initial value of the mirror surface angle in the reverse linking operation is stored in the memorizing unit, and the revere angle memorizing unit 132 changes the setting value into the initial value, upon detecting an operation different from a predetermined operation of shifting to "Inclination Memorizing Mode".

What is claimed is:

1. An electrically operated mirror control device, comprising:
a control unit, comprising:
a reverse linking unit for carrying out a reverse linking operation to tilt a mirror to change a mirror surface angle in linking with reversing of a vehicle; and
a reverse angle memorizing control unit for storing a first setting value of the mirror surface angle in the reverse linking operation in a memorizing unit; and
an angle adjusting unit for adjusting an amount of change in the mirror surface angle of the mirror in the reverse linking operation, wherein
when the reverse angle memorizing control unit detects a predetermined operation in the reverse linking operation, the reverse angle memorizing control unit changes the first setting value stored in the memorizing unit into a second setting value of the mirror surface angle including the amount of change in the mirror surface angle adjusted by the angle adjusting unit at an end of the reverse linking operation, and wherein
when the reverse linking unit carries out the reverse linking operation after the reverse angle memorizing control unit changes the first setting value stored in the memorizing unit into the second setting value of the mirror surface angle, the reverse linking unit changes the mirror surface angle from the first setting value to the second setting value.

2. The electrically operated mirror control device according to claim 1, wherein the predetermined operation is an operation of turning off an ignition switch once and subsequently turning on the ignition switch again.

3. The electrically operated mirror control device according to claim 1, wherein the predetermined operation is a motion of repeating the operation of turning off the ignition switch once and subsequently turning on the ignition switch again a predetermined number of times.

4. The electrically operated mirror control device according to claim 1, wherein the control unit further includes a memorizing inhibitor which prevents the reverse angle memorizing control unit from changing the setting value, upon detecting a predetermined condition being satisfied in a process of the predetermined operation.

5. The electrically operated mirror control device according to claim 4, wherein the predetermined condition is that the predetermined operation is not made in a predetermined time interval.

6. The electrically operated mirror control device according to claim 4, wherein the predetermined condition is that a door is opened during the predetermined operation.

7. A method of controlling an electrically operated mirror control device in a reverse linking operation, comprising the steps of:
providing
a control unit including a reverse linking unit, a reverse angle memorizing control unit, and an adjusting unit;
changing a first setting value stored in the memorizing unit into a second setting value of a mirror surface angle including an amount of change in the mirror surface angle adjusted by the angle adjusting unit at an end of the reverse linking operation, when the reverse angle memorizing control unit detects a predetermined operation in the reverse linking operation; and
storing the second setting value of the mirror surface angle including the amount of change in angle adjusted by the angle adjusting unit at the end of the reverse linking operation.

8. An electrically operated mirror control device, comprising:
a memory for storing a mirror angle having a first value which is initial;
a reverse linking unit for carrying out a reverse linking operation to tilt a mirror to change a mirror surface angle in linking with reversing of a vehicle on the basis of the mirror angle from the memory;
an angle adjusting unit responsive to a mirror switch for adjusting an amount of change in the mirror surface angle of the mirror in the reverse linking operation; and
a reverse angle memorizing control unit for detecting a predetermined operation, and storing in the memory a second value as the mirror angle including the amount of change in the mirror surface angle when the predetermined operation is detected.

* * * * *